(12) United States Patent
Margo

(10) Patent No.: US 6,298,525 B1
(45) Date of Patent: Oct. 9, 2001

(54) FLEXIBLE TUBE CLIP

(76) Inventor: Zender Margo, Andy Design, Ltd., 98 Main St., Suite 229, Belvedere, CA (US) 94920

( * ) Notice: Subject to any disclaimer, the term of this patent is extended or adjusted under 35 U.S.C. 154(b) by 0 days.

(21) Appl. No.: 09/415,791

(22) Filed: Oct. 8, 1999

(51) Int. Cl.$^7$ ........................... A44B 21/00; A63C 11/00; F16B 2/22
(52) U.S. Cl. .................. 24/336; 24/338; 24/339; 24/545
(58) Field of Search ................. 24/336, 339, 335, 24/337, 338

(56) References Cited

U.S. PATENT DOCUMENTS

| | | |
|---|---|---|
| 2,637,475 * | 5/1953 | Gialanella ................. 24/339 |
| 3,483,996 * | 12/1969 | Scammon ................. 24/336 |
| 3,778,537 * | 12/1973 | Miller ..................... 24/339 |
| 4,148,113 | 4/1979 | Dvorachek . |
| 4,334,659 | 6/1982 | Yuda . |
| 4,564,163 | 1/1986 | Barnett . |
| 4,653,716 | 3/1987 | Sakaguchi . |
| 4,669,156 | 6/1987 | Guido et al. . |
| 4,707,892 * | 11/1987 | Nelson ................... 24/336 |
| 4,837,899 * | 6/1989 | Young .................... 24/339 |
| 4,881,705 | 11/1989 | Kraus . |
| 4,883,290 * | 11/1989 | Landa ..................... 24/336 |
| 5,118,215 | 6/1992 | Freier . |
| 5,277,387 | 1/1994 | Lewis et al. . |
| 5,363,539 | 11/1994 | Tisol . |
| 5,414,911 * | 5/1995 | Adams .................... 24/545 |
| 5,613,655 | 3/1997 | Marion . |
| 5,845,883 | 12/1998 | Meyer . |
| 5,906,342 | 5/1999 | Kraus . |

FOREIGN PATENT DOCUMENTS

0020948 * 8/1898 (GB) ................... 24/339

* cited by examiner

*Primary Examiner*—Victor N. Sakran
(74) *Attorney, Agent, or Firm*—Thomas W. Cook

(57) ABSTRACT

A flexible double clip for use in creating arrays of generally cylindrical objects is disclosed, the clip consisting of flexible and resilient materials, the clip having sufficient flexibility to allow individual cylindrical objects, by expansion and twisting of the clip, to rotate in relation to each other about the axis of the clip.

15 Claims, 3 Drawing Sheets

FLEXIBLE TUBE CLIP

TECHNICAL FIELD OF THE INVENTION

The present invention relates to a flexible tube clip for use with flower arrangements and other purposes. More particularly, the present invention relates to a new clip, made of flexible, elastic or resilient materials, which clip is suitable for holding tubes and other cylindrical objects in generally parallel orientation, and which clip has sufficient flexibility to allow the tubes, by expansion and twisting of the clip, to rotate. The tube clip is formed from a plastic, such as polycarbonate, or other flexible material, and is formed so as to allow the clip to expand at each end as the tubes held by the clip may pry the ends of the clip apart during operation. The new clip of the present invention is therefore particularly suitable in applications requiring flexibility between cylindrical members (such as tubes or cables). Through such flexibility, individual cylindrical members may rotate about the axis of the clip so that adjacent members are no longer parallel, and a large variety of configurations for such cylindrical members is possible.

BACKGROUND ART OF THE INVENTION

In many tube and pipe clips, rigid and semi-rigid materials are combined to create a holding means for tubes and other generally cylindrical objects. Such clips are generally designed to secure the tubes so held to a stationary support through a connecting base, while others are intended to simply secure two or more tubes to each other. The clip of the present invention is of the latter variety, and so designed to secure two tubes to each other, without any additional support.

Most tube clips are also designed to secure tubes of indeterminate length. Accordingly, the inventive step of such clips often consists of apparatus designed to open up to receive the tubular member, and thereafter close around the tubular member when the clip is engaged. The clip of the present invention, on the other hand, is of a variety which may be slipped over a short tube, in order to secure it to other tubes of similar length, or longer tubes with the addition of rows of clips. As a result, the clip of the present invention does not open and close, but remains substantially in its final configuration at the time of purchase, during installation, and in use.

Finally, many tube clips are designed to secure one or many tubes, either to a separate support structure, or to each other. Such clips are often formed to allow the user to grip a number of tubes, and further allow the user to choose the number of tubes, from one to many, to be so gripped. The present invention is designed to grip only two tubes, as the use of multiple clips according to the present invention provides the capability of "ganging" such tubes and clips into an array having unusual flexibility between adjacent tubes, and among non-adjacent tubes within the array. Such arrays may be employed as display devices, carriers for small objects, storage for small objects, as a device which may assist in sorting objects having varying characteristics, or as "building blocks" for toys.

It may appreciated, in light of the foregoing discussion, that there is a need for a clip having the properties set forth herein and useful for the purposes mentioned above. The present invention is directed precisely to such useful properties and purposes.

A number of schemes have been devised to secure tubes, cables, and similar cylindrical objects to support structures and to each other, and apparatus, made of plastic or other flexible materials, have been developed accordingly. Various designs and configurations for such apparatus include:

U.S. Pat. No. 4,148,113 to Dvorachek, which discloses a clamp for securing a plurality of elongated articles in spaced relationship.

U.S. Pat. No. 4,653,716 to Sakaguchi, which discloses a synthetic resin holder, with hinge spring and base plate.

U.S. Pat. No. 4,669,156 to Guido et al., which discloses a pipe clip of resilient material.

U.S. Pat. No. 4,802,646 to Cattani, which discloses a clamp fitting, in particular for pipes and tubes.

U.S. Pat. No. 4,881,705 to Kraus, which discloses a plastic holding element intended for fastening at least one pipe to a support structure.

U.S. Pat. No. 5,118,215 to Freier, which discloses a pipe clip, with base plate, for fastening a single cylindrical object to a support.

U.S. Pat. No. 5,277,387 to Lewis et al., which discloses a holding element made of plastic for fastening a single cylindrical object to a support.

U.S. Pat. No. 5,363,539 to Tisol, which discloses a flexible tube clip assembly for mounting a plurality of tubular elements.

U.S. Pat. No. 5,613,655 to Marion, which discloses a clip assembly, with hinge and clasp, for fastening objects to a support.

U.S. Pat. No. 5,845,883 to Meyer, which discloses a flexible clip assembly for fastening a single cylindrical object to a panel.

U.S. Pat. No. 5,906,342 to Kraus, which discloses a holding device made of plastic for fastening a single tube-shaped body to a support.

In the above-noted inventions, and in other prior art, flexible or resilient clips are formed from plastic or resin to accomplish the purposes set forth in these corresponding patents. However, the clips disclosed in these patents are not suitable for the functions accomplished by the present invention. More particularly, but not exclusively, prior art clips do not allow a user to fasten one or more cylindrical objects together in such fashion that the user may rotate and reorient each such object, in relation to its adjacent object. Such rotation and reorientation, while relatively minor when viewed one object to the next, amounts to a large reorientation when a number of objects, fastened together by a number of clips, are employed.

The present invention is directed to such rotation and reorientation among cylindrical objects by use of a new and useful clip according to the present invention to achieve, in one preferred application, an array of cylindrical objects having unusual flexibility. Such an array using the clip of the present invention has a variety of uses not found in the prior art.

DISCLOSURE OF INVENTION

Summary of the Invention

A clip for holding cylindrical objects, such as tubes and cables, consists, in its simplest form, of one or more holding portions, designed to grasp the object or objects to be secured, and a connecting portion, designed either to connect the holding portion or portions to a structural support or to each other. The holding portion of the clip is generally formed of some resilient or flexible material, and often includes a clasp or closure for encircling a cylindrical object.

However, in some clips no clasp or closure is evident, as the clip relies on the resilient material from which the clip is composed to provide sufficient closing force to retain the cylindrical object. The connecting portion of the clip is generally formed from the same resilient material comprising the holding portions, although other materials are sometimes incorporated into the connecting portion in order to lend additional strength, or provide additional capabilities, such as spring loading which automatically closes the holding portion of the clip.

The present invention provides a new flexible tube clip, easy and inexpensive to manufacture, and easy for a user to quickly employ to assemble cylindrical objects into an assemblage of cylindrical objects having unusual properties derived from the form and composition of the clip. The clip of the present invention has two holding portions, or sets of prongs, for securing, by partially encircling, tubes or other cylindrical objects to be held. However, the ends of each holding portion, at the ends of the prongs, are open. This allows the holding portions to flex, being composed of flexible and resilient material, when tubes or other objects are inserted into the holding portions. The clip holding portions are sized to be slightly smaller than the objects to be held, and composed of elastic material, so that the holding portions flex, while the prongs of such portions spread slightly when a tube is placed within the prongs. As a result, the clip prongs are subjected to slight tension when a tube is in place, and, because the clip is formed from resilient material, the prongs of the clip exerts a closing force around the tube to thereby hold it in place.

The flexibility of the prongs of the clip of the present invention is increased by the shape of the prongs, which are formed to be of substantially uniform thickness from the tip of each prong to the connecting member between the prongs. This is in contrast to thickening the prongs at their base in order to increase strength of the prongs at the point where the stress of opening the holding portion of the clip may cause cracking or breakage. Such thickening, while desirable in some clips, is not desirable in the clip of the present invention, as thickening at the base of the prongs will result in shifting stress to the connecting portion of the clip and, at the same time, decreasing overall flexibility. The shape of the prongs and connecting portion of the clip in the present invention is calculated to achieve maximum flexibility, to thereby gain the ability to vary the orientation of the secured cylindrical objects. As maximum flexibility is most important to the clip of this new design, the clip is formed to optimize such flexibility. The opposing need for strength is addressed by forming the clip of a material having the requisite structural properties.

The clip of the present invention also has a connecting portion between its two holding portions, for securing each holding portion to the other. The connecting portion is, in one preferred embodiment, composed of the same material comprising the prongs of the holding portions. Accordingly, in such embodiment, the clip of the present invention may be injection molded, or otherwise formed, of a single compound, thereby making manufacturing simple and inexpensive. As with the prongs of the holding portions of the clip, the connecting portion of the clip is of substantially uniform thickness. And, as with the prongs, such uniformity in thickness provides additional flexibility in the connecting portion of the clip, and distributes the stress applied to the connecting portion uniformly over its length. As with the holding portions of the clip, strength is of secondary concern over flexibility, so long as a material exists which can supply sufficient strength, when under stress, to resist cracking and breaking.

Moreover, the connecting portion of the clip is of substantially the same thickness as the prongs of the holding portions of the clip, with only a minor thickening at the points of their joining. Such an overall uniformity distributes the stress placed on the clip uniformly between the prongs of the holding portion and the connecting portion when a tube is inserted in the holding portion. When two tubes are inserted in the holding portions, thereby securing both tubes, the stress of spreading the prongs of the holding portion is removed from the connecting portion, there being an offsetting spreading force on each side of the clip. However, the stress of spreading the prongs of the clip remains on the prongs of the holding portions even after two tubes are secured in the clip.

Accordingly, when viewed from the top, the parts of the clips of the present invention appear to be uniformly thick. The prongs are formed to follow the cylindrical shape of the tubes to be held (although forming a circular shape of slightly smaller diameter), except at their base, where the prongs join the connecting portion of the clip. At the base of the prongs, the prongs and the connecting portion each vary from such a circular shape, the point of joinder being further away from the center of the circular shape delineated by the prongs of the holding portions, and so further from the center of any tube held by the clip when tubes and clip are assembled.

When viewed from the side, the clip of the present invention, in one preferred embodiment, is also of uniform width, primarily to allow ease of manufacture, but also to allow the clips to take the stress spreading benefit derived from the uniform thickness of prongs and connecting portions.

As noted above, the need for strength in each portion of the clip is addressed by forming the clip of a material having the requisite structural properties. This material may be synthetic resin, compounds containing rubber, various plastics, or any other compound having the required flexibility, resistance to cracking and breaking, structural strength, and overall elasticity. However, the preferred material, in one preferred embodiment of the present invention, is that material commonly known as "polycarbonate," one brand of which is presently "Lexan 121." Even using polycarbonate such as Lexan, sufficient structural strength is best achieved with a sufficiently large number of injection points in the mold forming the clip. A preferred number for such injection points is ten, with one at the end of each of the four prongs of the clip, two at the point of junction between the prongs and the connecting member, and one midway along each prong between its end and its base.

In use, the clip of the present invention is slipped around the end of a tube, such as a "test tube," and slid along the length of the tube to any desired position. The insertion of a tube within the prongs on one side of the clip spreads the prongs on that side slightly. As the clip is composed of elastic material, the prongs of the clip are pressed against the outer wall of the tube, thereby holding the tube in place. A second tube may then be slipped through the holding portion of the clip at the other end of the clip, and positioned as desired. In such position, each tube is then held in place, substantially parallel with respect to the other tube. However, in this position each tube may also be rotated within the clip, the clip acting during such rotation as a sort of hinge. During such rotation, the force exerted by the user is translated to the tubes, and through the tubes to the clip. This force causes deformation of the clip in three ways. Firstly, the prongs of each holding portion of the clip spread, in response to the twisting action of the tubes, to accommodate the counter force exerted, through the connecting portion, by the other tube. Secondly, the connecting portion of the clip twists on an axis perpendicular to the major axis of the clip, and perpendicular to the length of the tubes (when oriented parallel). Finally, the prongs of the clip, being pushed down on one side and up on the other side, move to accommodate these forces. Thus, the prongs simultaneously spread and twist. The sum of all these deformations in the clip allow the tubes held by that clip to reorient away from their initially parallel position substantially. With clips formed from polycarbonate, this reorientation may be, with the application of sufficient force, in excess of 120 degrees before one tube slips away from the prongs of the clip. When released, the tubes are again realigned to substantially parallel orientation, the elasticity of the polycarbonate, returning them substantially to their starting point.

A user may slip a second clip over each tube of the above two-tube arrangement, and slide the second clip along the tubes to any desired position other than that occupied by the first clip. In such positions, two clips of the present invention may hold two tubes at two points along their length, with the following effect on rotational characteristics: Firstly, the amount by which the two tubes may vary from parallel orientation is reduced to about 30%, more or less, as the two clips limit the travel of each end of the tubes. Secondly, the two clips together create sufficient frictional force against the tubes to hold the tubes when they are twisted into a non-parallel orientation. When a second pair of clips are employed to secure a third tube to the second tube, the third tube likewise may rotate up to about 30% from parallel orientation, and it too is restrained from returning to such orientation by friction with the clips. As a result, a user may twist the first and third tubes so that they reorient up to about 60% from parallel orientation, with the second tube about midway between. By adding additional tubes and clips in the forgoing manner, a user can construct a series of tubes in a variety of configurations heretofore unavailable in the prior art. Such configurations include a three dimensional horizontally shaped array, all of which elements rest at one point on a flat surface. Other configurations include arrays in which some elements rest at some point on a flat surface, while other elements, through the resistance to movement created by friction between clips and tubes, are lifted or held off the flat surface vertically. Still further vertically oriented arrays may be created by use of additional tubes, which may be joined, at their ends, to the ends of existing tubes, and one to another by additional clips of the present invention. In such manner, two and three dimensional arrays may be created which may be utilized to good effect in a laboratory or medical setting, or as decorative containers for small objects or larger protruding objects, such as flowers. Such arrays may also be utilized as toys, as elements are joined together to construct arrays of almost unlimited size and complexity, and even as musical instruments, as the tone a user will hear upon striking a tube will vary as the placement of a clip or the fluid contained within a tube varies.

By the above process, a user may assemble one or more tubes, and quickly manipulate the resultant assembly to reconfigure it at will, thereby creating a large variety of shapes, and secure the assembly in such shapes, ready to accomplish a large variety of tasks. The reconfiguration process is both quick and convenient for the user, and the resultant container useful for a variety of purposes and pleasing to the eye. Such purposes include, but are not limited to, containing an array of flowers (i.e., creating a vase), each flower being individually held in its own tube.

The more important features of the invention have thus been outlined, rather broadly, so that the detailed description thereof that follows may be better understood, and in order that the present contribution to the art may be better appreciated. Additional features of specific embodiments of the invention will be described below. However, before explaining preferred embodiments of the invention in detail, it may be noted briefly that the present invention substantially departs from pre-existing designs of the prior art, and in so doing provides the user with the highly desirable ability to easily erect an array of tubes useful for containing a variety of objects, and manipulate that array to create a pleasing shape.

Objects of the Invention

The principal object of the present invention is to provide a new clip by which tubes, cables, and other cylindrical objects may be held securely, one to another, in an array of indeterminate length, having an indeterminate number of tubes.

A further object of the present invention is to provide a clip in such form, and composed of such materials, that individual cylindrical objects may be held by the clips, but rotated, one against the next, without cracking or breaking the clips.

A further object of the present invention is to provide a clip which, when combined with cylindrical objects and additional clips, may be utilized to create a pleasing array upon securing a number of cylindrical objects to each other, which array may be manipulated, by twisting, to create a large number of different array shapes.

A further object of the present invention is to provide a clip which, when combined with cylindrical elements and additional clips, may be utilized to create an array, some of which elements stand on a flat surface, while other elements are lifted by means of the clips off the flat surface.

A further object of the present invention is to provide a clip which, when combined with cylindrical elements and additional clips, may be utilized to create an array of indeterminate size, which array may be utilized for a large variety of purposes, including creating a musical instrument, storage of flowers or small objects, medical purposes, decorative containers, or toys, such as building blocks.

BRIEF DESCRIPTION OF DRAWINGS

The accompanying drawings, which are incorporated in and constitute a part of this specification, illustrate one embodiment of the invention and, together with the description, serve to explain the principles of the invention.

DESCRIPTION OF A FIRST PREFERRED EMBODIMENT

Figure 1:
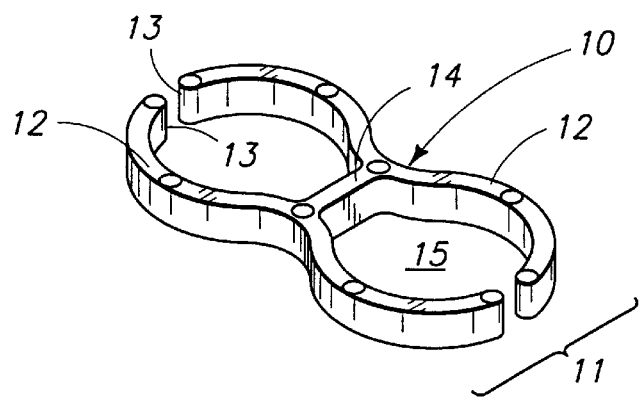
FIG. 1 is a top-side perspective view of a first preferred embodiment of a double clip constructed in accordance with the principles of the present invention.

Referring initially to FIG. 1, the double clip 10 constructed in accordance with the principles of the present invention is shown. A holding portion 11 of the clip 10 is shown at each end of the clip, each holding portion having prongs 12, the prongs having ends 13. A connecting portion 14 connects each holding portion 11 on each side of the clip 10. The gaps 15 between the ends 13 of prongs 12. The distance between prongs 12 on one side of the clip 10, at the midpoint of the prongs, is slightly less than the diameter of objects to be held by the clip.

Figure 2:
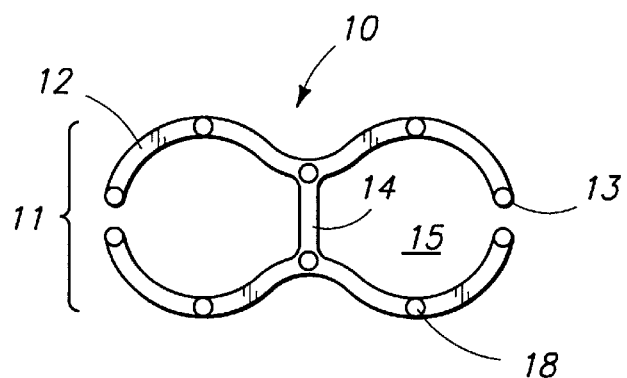
FIG. 2 is a top down plan view of the same embodiment of the double clip of the present invention found in FIG. 1.

Referring now to FIG. 2, the double clip 10 constructed in accordance with the principles of the present invention is shown again as if viewed from the top or bottom. When viewed from the top, the prongs 12 of the holding portions 11 and the connecting portion 14 are substantially uniformly thick. Injection points 18 are shown at the ends 13 of the prongs 12, and at the intersection of, or point of joinder of, the connecting portion 14 and the prongs 12, and again midway between the ends 13 of the prongs 12 and the connecting portion 14 of the clip 10.

Figure 3:
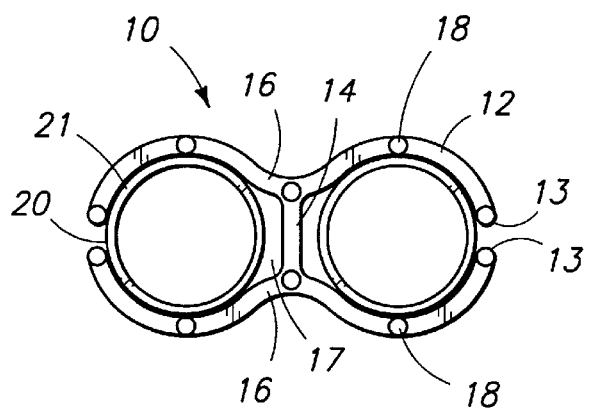
FIG. 3 is a top down view of the same embodiment of the double clip of the present invention found in FIGS. 1 and 2, into which test tubes have been placed.

In FIG. 3, the double clip 10 constructed in accordance with the principles of the present invention is shown again as viewed from the top or bottom. However, in FIG. 3, the prongs 12 are spread slightly from their original configuration in FIG. 2, the ends 13 of the prongs 12 being displaced from their prior positions in FIG. 2, as they are forced apart in FIG. 3 by the exterior walls 20 of two test tubes 21. It may be noted that the prongs 12 are formed to follow the cylindrical shape of the tubes 21, except at their base 16, where the prongs 12 join the connecting portion 14 of the clip 10. At the base 16 of the prongs 12, the prongs and the connecting portion 14 varies from such a circular shape, the point of joinder at the base 16 being further away from the center of the test tubes 21 when such tubes and clips are assembled. Thus, the position of the prongs 12 and connecting portion 14 form gaps 17 between the connecting portion 14 and the exterior walls 20 of the test tubes 21 when such tubes 21 and clips 10 are assembled as in FIG. 3. Again, injection points 18 are shown at the ends 13 of the prongs 12, at the intersection of the connecting portion 14 and the prongs 12, and midway between the ends 13 of the prongs 12 and the connecting portion 14 of the clip 10.

Figure 4:
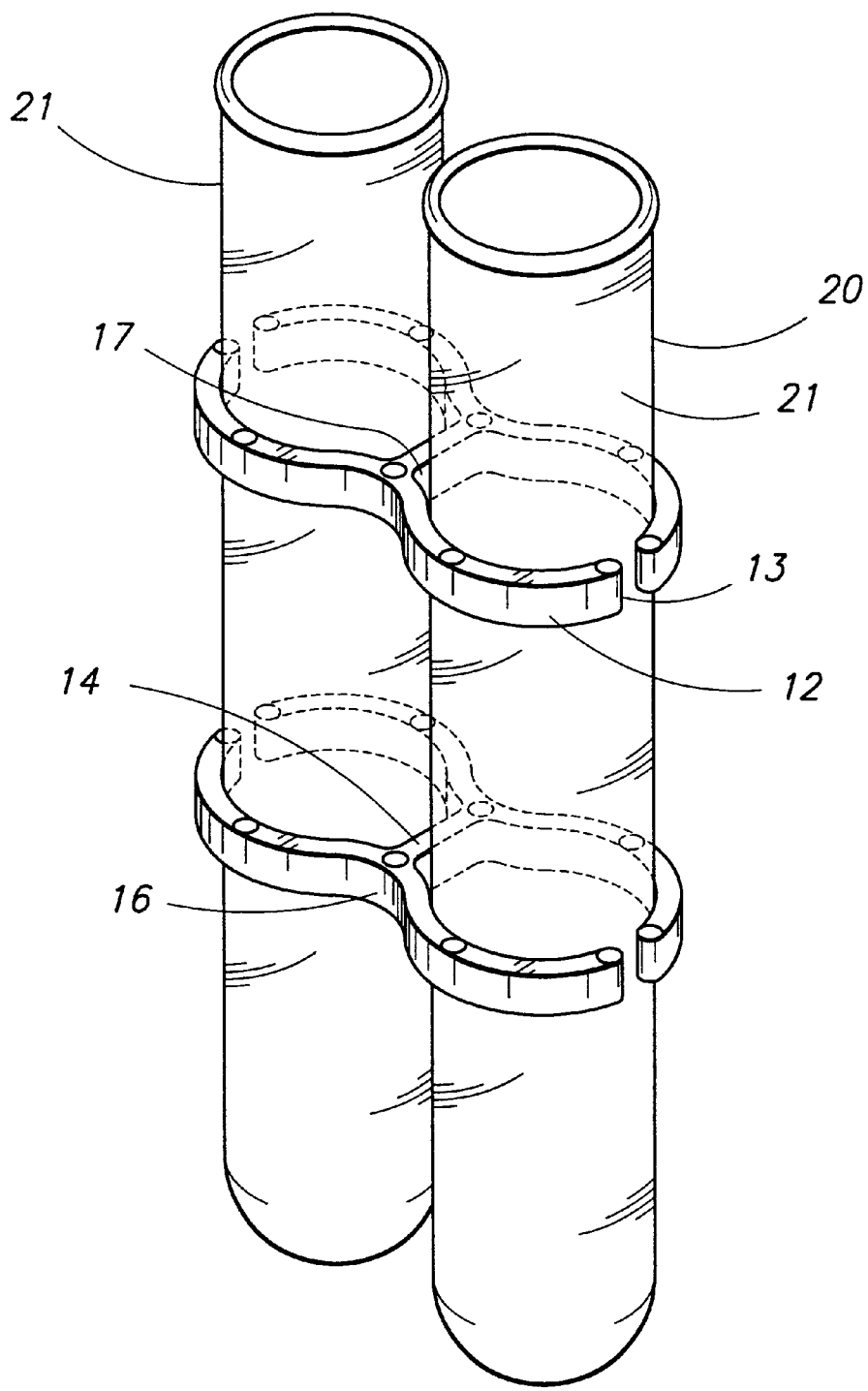
FIG. 4 is a perspective view of two double clips of the present invention found in FIGS. 1 through 3, into which two test tubes have been placed.

Referring now to FIG. 4, two double clips 10 constructed in accordance with the principles of the present invention are shown viewed in perspective and slipped on to two test tubes 21. As in FIG. 3, the prongs 12 are spread slightly from their original configuration in FIG. 2, the ends 13 of the prongs 12 being displaced from their prior positions. The prongs 12 are again forced apart in FIG. 4 by the exterior walls 20 of two test tubes 21. Again, it may be noted that the prongs 12 are formed to follow the cylindrical shape of the tubes 21, except at their base 16, where the prongs 12 join the connecting portion 14 of the clip 10. Accordingly, the point of joinder at the base 16 of the prongs 12 are further away from the center of the test tubes 21 when such tubes and clips are assembled. Thus, the position of the prongs 12 and connecting portion 14 form gaps 17 between the connecting portion 14 and the exterior walls 20 of the test tubes 21 when such tubes and clips 10 are assembled.

Figure 5:
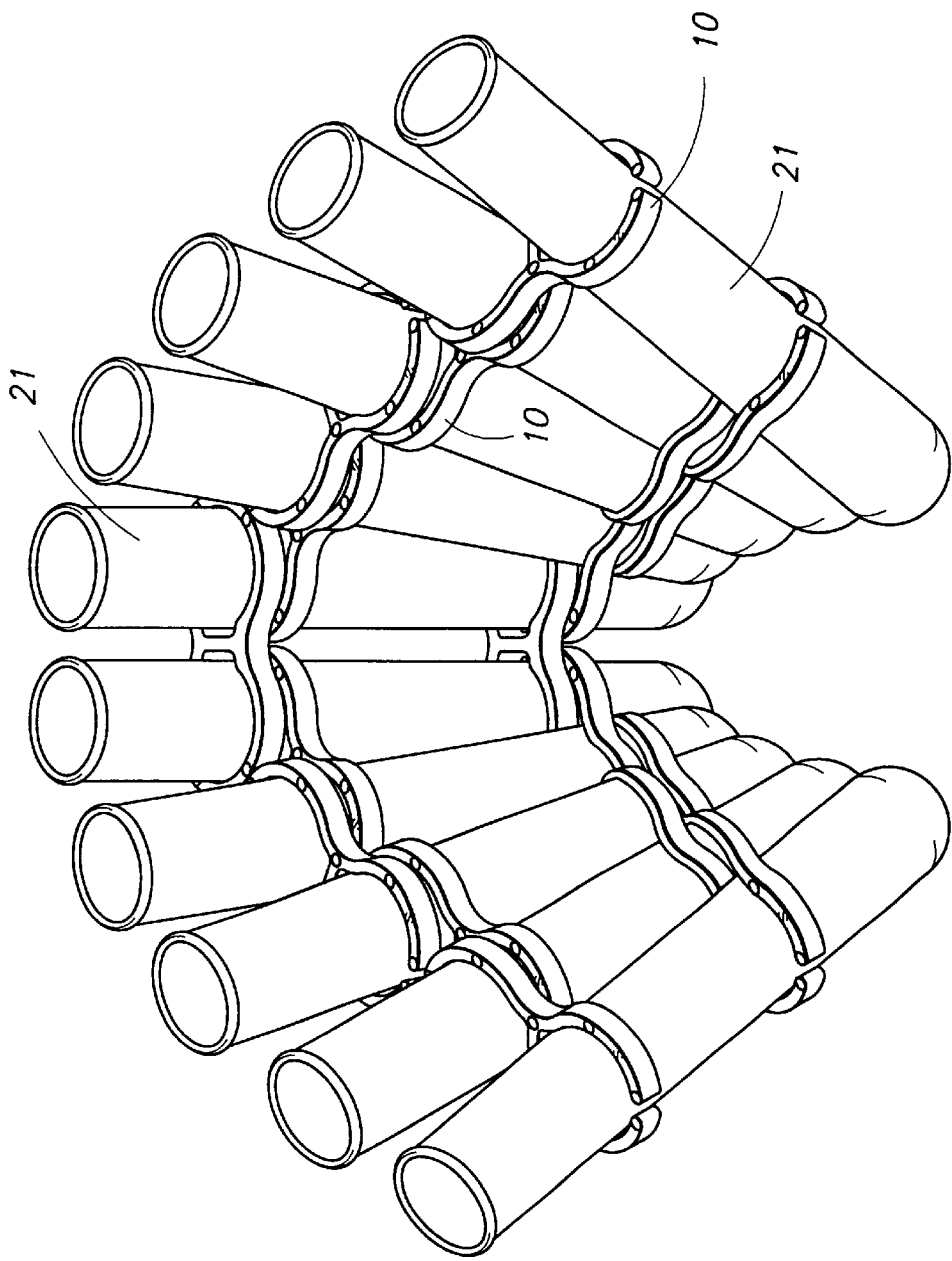
FIG. 5 is a perspective view of an array of test tubes secured together by double clips of the present invention found in FIGS. 1 through 4.

Referring finally to FIG. 5, multiple double clips 10 constructed in accordance with the principles of the present invention are shown viewed in perspective and slipped on to multiple test tubes 21, thereby creating an array of tubes which may be manipulated to a variety of shapes. In FIG. 5, the clips 10 are placed near the ends of the tubes 21, with the two holding portions of each clip 10 grasping the corresponding ends of adjacent tubes 21. In such configuration, adjacent tubes 21 may be twisted, one against the other, and such tubes will remain substantially in place in their twisted position when released by the user. In such configuration, the entire assembly of adjacent and non-adjacent tubes may be positioned to take advantage of the reorientation resulting from the twist between adjacent tubes, thereby allowing the user to create arrays in which the tubes may greatly deviate from substantially parallel orientation, or in which the tubes may be arranged so that some tubes rest on a flat surface while others are held above such surface.

What is claimed is:

1. A clip for retaining a plurality of generally cylindrical objects, comprising:

a first holding portion having a first prong and a second prong, the first prong having an end and a base, the second prong having an end and a base, the first prong and the second prong oriented generally parallel with one another near their bases, the first prong having a first curve near its base away from the second prong, the first prong having a second curve near its end toward the second prong, the second curve of the first prong having a generally circular shape, the second prong having a first curve near its base away from the first prong, the second prong having a second curve near its end toward the first prong, the second curve of the second prong having a generally circular shape, a second holding portion having a third prong and a fourth prong, the third prong having an end and a base, the fourth prong having an end and a base, the third prong and the fourth prong oriented generally parallel with one another near their bases, the third prong having a first curve near its base away from the fourth prong, the third prong having a second curve near its end toward the fourth prong, the second curve of the third prong having a generally circular shape, the fourth prong having a first curve near its base away from the third prong, the fourth prong having a second curve near its end toward the third prong, the second curve of the fourth prong having a generally circular shape, the base of the first prong is affixed to the base of the third prong, the base of the second prong is affixed to the base of the fourth prong, a single connecting portion attached to the bases of the first, second, third and fourth prongs, and extending from the bases of the first and third prongs to the bases of the second and fourth prongs, the first holding portion is formed of resilient material, whereby the ends of the first and second prongs may spread, the second holding portion is formed of resilient material, whereby the ends of the third and fourth prongs may spread, and the single connecting portion is formed of resilient material, whereby the single connecting portion may twist to allow movement between the first and second prongs and between the third and fourth prongs.

2. The clip of claim 1, wherein the first, second, third, and fourth prongs, and the single connecting portion are formed in a single piece of resilient material.

3. The clip of claim 2, wherein the first, second, third, and fourth prongs, and the single connecting portion are substantially uniformly thick.

4. The clip of claim 3, wherein the resilient material is a polycarbonate.

5. The clip of claim 4, further comprising a plurality of cylindrical objects held within the holding portions of the clip to form an array of such cylindrical objects.

6. The clip of claim 1, wherein the resilient material is a polycarbonate.

7. The clip of claim 6, wherein the first, second, third, and fourth prongs, and the single connecting portion are substantially uniformly thick.

8. The clip of claim 7, further comprising a plurality of cylindrical objects held within the holding portions of the clip to form an array of such cylindrical objects.

9. A clip for retaining a plurality of generally cylindrical objects, comprising:

a first portion having a first prong and a second prong, the first prong having an end and a base, the second prong having an end and a base, the base of the first prong is affixed to the base of the second prong, the first and second prongs are oriented generally parallel with one another near their bases and extending in opposite directions, a second portion having a third prong and a fourth prong, the third prong having an end and a base, the fourth prong having an end and a base, the base of the third prong is affixed to the base of the fourth prong, the third and fourth prongs are oriented generally parallel with one another near their bases and extending in opposite directions, a single connecting portion is attached to the bases of the first, second, third and fourth prongs, the single connecting portion extends from the bases of the first and second prongs to the bases of the third and fourth prongs, the first prong and the third prong are oriented generally parallel with one another across the single connecting portion, the second prong and the fourth prong are oriented generally parallel with one another across the single connecting portion, the first, second, third, and fourth prongs, and the single connecting portion are all formed of resilient material, the first prong curves near its base away from the third prong, the first prong curves near its end toward the third prong in a generally circular shape, the second prong curves near its base away from the fourth prong, the second prong curves near its end toward the fourth prong in a generally circular shape, the third prong curves near its base away from the first prong, the third prong curves near its end toward the first prong in a generally circular shape, the fourth prong curves near its base away from the second prong, the fourth prong curves near its end toward the second prong in a generally circular shape.

10. The clip of claim 9, wherein the first, second, third, and fourth prongs, and the single connecting portion are substantially uniformly thick.

11. The clip of claim 10, wherein the resilient material is a polycarbonate.

12. The clip of claim 11, further comprising a generally cylindrical object held between the first prong and the third prong, and a generally cylindrical object held between the second prong and the fourth prong.

13. The clip of claim 9, wherein the resilient material is a polycarbonate.

14. The clip of claim 13, wherein the first, second, third, and fourth prongs, and the single connecting portion are substantially uniformly thick.

15. The clip of claim 14, further comprising a generally cylindrical object held between the second first prong and the third prong, and a generally cylindrical object held between the second prong and the fourth prong.

* * * * *